Feb. 28, 1950 C. L. HINSDALE 2,499,220

RACK FOR PHONOGRAPH RECORDS

Filed April 9, 1946

Clare L. Hinsdale.
INVENTOR.

BY W B Harpman

ATTORNEY.

Patented Feb. 28, 1950

2,499,220

UNITED STATES PATENT OFFICE 2,499,220

RACK FOR PHONOGRAPH RECORDS

Clare L. Hinsdale, Girard, Ohio

Application April 9, 1946, Serial No. 660,654

1 Claim. (Cl. 211—40)

This invention relates to means for filing and storing phonograph records.

The principal object of the invention is the provision of means for filing and storing phonograph records in a manner facilitating cataloging.

A further object of the invention is the provision of means for filing and storing phonograph records and comprising a dust-proof, lightweight, compact container capable of holding a group of phonograph records separate from similar groups.

A still further object of the invention is the provision of means for filing and storing phonograph records and comprising an economically made and conveniently installed unit, each of which holds a group of records such as may be played at one time on an automatic phonograph.

A still further object of the invention is the provision of means for filing and storing phonograph records and comprising a plurality of cradles pivoted to a common pivot, which cradles provide for cataloging of the records therein and hold a group of records in vertical position.

The phonograph record filing and storing means shown and described herein has been devised to form a simple and efficient means of handling phonograph records particularly with respect to groups of records as commonly employed with an automatic phonograph.

It is well known that several attempts have been made to provide means for filing and storing phonograph records, which means usually comprised various pivoted envelope structures in which single phonograph records were positioned, the most common of these being the phonograph album. Similar structures have been proposed for incorporation in phonograph cabinets but all of them have been objectionable both from a cost standpoint and from efficiency in operation.

The present invention comprises a simply formed device which is of unitary construction thereby allowing great flexibility in the number of groups of records to be filed and stored and at the same time handling these records in groups as is customary in automatic phonograph operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the rack for filing and storing phonograph records and illustrates in solid lines the rack in storage position showing in solid lines a group of records therein.

Dotted lines in Figure 1 show the track and a group of records in delivery position. Additional dotted lines also indicate the presence of a supporting structure.

Figures 1, 2, 3, 4, 5:
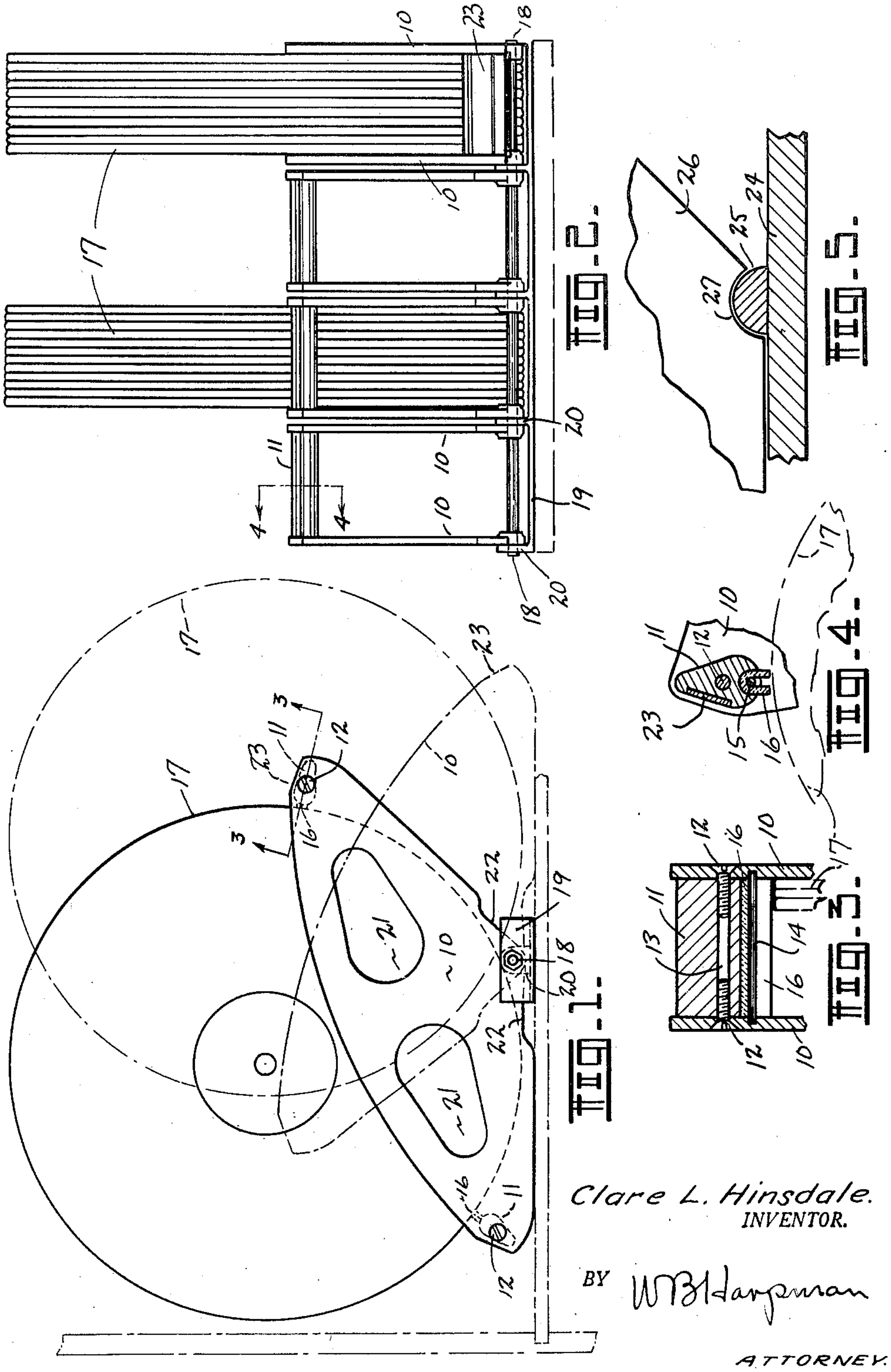
Figure 2 is a front elevation of a rack for filing and storing phonograph records.
Figure 3 is an enlarged cross section taken on line 3—3 of Figure 1 and shows the record retaining and cushioning means.
Figure 4 is an enlarged cross section taken on line 4—4 of Figure 2.
Figure 5 is an enlarged cross section of a modified form of pivotal mounting for a phonograph filing and storage rack.

By referring to Figures 1 and 2 of the drawings it will be seen that the phonograph record filing and storage rack consists of a plurality of triangularly shaped cradles, each of which is formed of a pair of vertically positioned side plates 10 spaced apart at their outermost ends by spacing members 11. As may be seen in Figures 3 and 4 of the drawings, the spacing members 11 are composite structures including a pair of screws 12 positioned in oppositely disposed relation in threadable engagement with an opening 13 in each of the spacing members 11 and also engaging openings in the side plates 10. The construction of the spacing members 11 also includes a transversely positioned pin 14 which, in conjunction with a transversely formed groove 15 in the spacing members 11, holds a section of felt 16 in U shape thereby providing a suitable bumper for the edges of records 17 positioned in the cradle. It will be observed that the spacing of the spacing members 11 with respect to one another is such that the radius of the records 17 is supported by two point contact therewith and thus suitably held in a cushioned relationship with respect to the cradle.

By referring again to Figures 1 and 2 of the drawings it will be observed that each of the cradles is preferably of a width sufficient to receive 12 of the records 17 which is the usual number accommodated by an automatic phonograph.

It will further be seen that a multiple record filing and storing arrangement is provided by mounting a plurality of the cradles side-by-side on a common pivot as shown in Figure 2, the pivot being indicated by the numeral 18. Whether one cradle or a plurality of cradles are used, each is mounted on the pivot 18 which may be of varying lengths as required and which in turn is supported by a bracket 19 having at least two upwardly formed extensions 20 thereon spaced apart a distance slightly greater than the over-all width of one of the cradles. It will be obvious to those skilled in the art that the bracket 19 may be mounted on any surface such as the bottom of a conventional record compartment in an automatic radio phonograph combination, or it may be enclosed in a separate and distinct cabinet, or it may be used without such mounting by placing it on a flat surface such as a table top. In any location the record filing and storing rack operates simply and efficiently in holding groups of records.

Still referring to Figures 1 and 2 of the drawings it will be observed that each of the side plates 10 is preferably provided with cut-out sections 21 to lighten the structure and that the portions thereof adjacent the apex of the triangular shape, which is the pivot point with respect to the pivot 18, are offset, as indicated by the numerals 22, to permit the cradles to tilt into storage or access positions, as shown by the solid and dotted lines, respectively. It will be observed that this tilting action moves the groups of records in the cradles a considerable distance forward and backward of the pivot 18, which motion may be advantageously used in moving the records into and out of a radio phonograph combination cabinet.

It will also be seen that in either storage or access position the cradles and their record contents rest upon the pivot 18 and the edges of the side plates 10, and the center of gravity is necessarily moved over the pivot 18 to position the cradles and their records. The construction of the record filing and storage rack therefore eliminates the possibility of accidental opening of the rack and dropping of the records. Even in open or access position the records 17 will not roll out of the rack as the foremost spacing member is at a plane higher than the lowest portion of the cradle. The records are suspended in each cradle by two point suspension on the felt 16 of the spacing members 11.

In order that groups of records positioned in the record filing and storing rack may be easily identified, the spacing members are elongated in depth sufficiently to provide space for a suitable indexing or cataloging card as illustrated in Figures 2 and 4 by the numerals 23. By referring to Figures 1 and 2 of the drawings it will be seen that whether the rack is in storing or access position, the card 23 is positioned in a location and at an angle making it perfectly legible at all times. In Figure 2 of the drawings the cradle to the right of the figure is shown in access position with the records 17 therein occupying the position shown in dotted lines in Figure 1, it being observed that the card 23 now appears in the lower forefront of the cradle. Thus, records by a certain artist may be grouped and filed in the filing and storing rack and readily removed by moving the rack into access position (as shown in dotted lines in Figure 1) by manually depressing the foremost or front end of the individual cradle, the groups being readily identified by the cards 23 positioned on the spacing members 11.

It will be obvious to those skilled in the art that an alternate method of pivoting the cradles of the record filing and storing rack is possible and such a modification is shown in Figure 5 of the drawings wherein a base member 24 carries a transversely positioned section of half-round material 25 and the cradles 26 are provided with a half-round indentation 27 thereby permitting them to rock over the half-round 25 as shown. This construction is feasible due to the simplicity of the formation of the cradles and the fact that they are equally advantageous in use on any flat surface as well as in connection with a record enclosure in a radio phonograph cabinet.

Having thus described my invention, what I claim is:

A record filing and storage rack including a base member incorporating pivot means and at least one cradle positioned thereon for receiving a plurality of records therein, said cradle comprising side plates having spacing means at its foremost and rearmost ends, said spacing means each comprising members having a groove in their innermost edges, a U-shaped section of felt positioned in said groove and a pin positioned axially in the said groove between the said side plate members and holding the said U-shaped felt in position, said spacing means forming yieldable bumpers for supporting records therebetween.

CLARE L. HINSDALE.

REFERENCES CITED

The following references are of record in the file of this patent:

UNITED STATES PATENTS

| Number | Name | Date |
|---|---|---|
| 1,208,346 | Marsh | Dec. 12, 1916 |
| 1,252,078 | Bender | Jan. 1, 1918 |
| 1,358,833 | Dolman | Nov. 16, 1920 |
| 1,775,018 | Coenen | Sept. 2, 1932 |
| 1,914,564 | Grandjean | June 20, 1933 |
| 2,275,664 | Whitney | Mar. 10, 1942 |

FOREIGN PATENTS

| Number | Country | Date |
|---|---|---|
| 437,771 | Great Britain | Nov. 5, 1935 |